US012667853B2

(12) United States Patent
Hofman

(10) Patent No.: US 12,667,853 B2
(45) Date of Patent: Jun. 30, 2026

(54) HANDHELD SHOWERHEAD WITH MAGNETIC COUPLING ASSEMBLY

(71) Applicant: ETL, LLC, Reno, NV (US)

(72) Inventor: David Hofman, Reno, NV (US)

(73) Assignee: ETL, LLC, Sparks, UT (US)

( * ) Notice: Subject to any disclaimer, the term of this patent is extended or adjusted under 35 U.S.C. 154(b) by 105 days.

(21) Appl. No.: 18/788,983

(22) Filed: Jul. 30, 2024

(65) Prior Publication Data

US 2026/0034551 A1 Feb. 5, 2026

(51) Int. Cl.
*B05B 1/18* (2006.01)
*E03C 1/04* (2006.01)

(52) U.S. Cl.
CPC ............ *B05B 1/185* (2013.01); *E03C 1/0409* (2013.01)

(58) Field of Classification Search
CPC .............................. B05B 1/185; E03C 1/0409
See application file for complete search history.

(56) References Cited

U.S. PATENT DOCUMENTS 6,594,832 B2 * 7/2003 Yang ........................ E03C 1/06 4/570
11,149,417 B2 10/2021 Wu et al.
11,857,983 B2 1/2024 Yan
2023/0104710 A1 * 4/2023 Zhadanov ............... B05B 15/62 4/615
2023/0158535 A1 5/2023 Ni et al.
2024/0009688 A1 * 1/2024 Clarke .................. E03C 1/0409

FOREIGN PATENT DOCUMENTS

CN 215655972 U 1/2022
CN 215964193 U 3/2022
CN 117046628 A 11/2023

* cited by examiner

*Primary Examiner* — Janie M Loeppke
(74) *Attorney, Agent, or Firm* — ONE LLP

(57) ABSTRACT

An improved handheld showerhead assembly is provided which includes a handheld showerhead. In addition, the showerhead assembly includes a mounting structure for affixing the handheld showerhead to a wall of a shower stall. The mounting structure includes a magnet which is affixed to the backside of the showerhead. The mounting structure also includes a wall strip made of a ferromagnetic material intended to be affixed to a shower stall wall. The wall strip is preferably elongated and intended to be mounted by a fastener upon a shower stall wall with the wall strip's long axis extending vertically so that the handheld showerhead can be affixed at various heights upon the shower stall wall. Also preferably, the magnet is affixed to the showerhead by a ball joint so that the showerhead can swivel vertically and side-to-side.

13 Claims, 10 Drawing Sheets

HANDHELD SHOWERHEAD WITH MAGNETIC COUPLING ASSEMBLY

BACKGROUND OF THE INVENTION

The present invention is showerheads. More particularly, the present invention relates to handheld showerheads and mechanisms for affixing them to different positions upon a wall.

Showerheads are commercially available in numerous designs and configurations for use in showers, faucets, spas, sprinklers and other personal and industrial systems. The vast majority of showerheads include spray heads which may be categorized as being either stationary or oscillating and have either fixed or adjustable openings. Stationary spray heads with fixed jets are the simplest constructions consisting essentially of a central channel connected to one or more spray nozzles directed to produce a constant pattern. Multi-function spray heads are able to deliver water in different spray patterns such as a fine spray, a coarse spray, a pulsating spray, or even a flood pattern producing a high fluid flow.

Simple showerhead assemblies are fixed directly to a pipe which extends from a shower stall wall. These constructions are inexpensive and require no effort to utilize. Conversely, a handheld showerhead assembly typically includes a hollow handle connected to a water supply by a flexible rubber hose. The handle has a proximal end which typically has a threaded inlet for connecting to the rubber hose. Meanwhile, at the handle's distal end, the showerhead assembly includes a showerhead including a plurality of nozzles for ejecting water. Typically, the handle and showerhead face are angled relative to one another so that water is ejected at approximately 90 degrees relative to the handle's longitudinal axis.

Advantageously, the showerhead handle allows users to manipulate the spray nozzles into various positions and alignment to assist in the cleaning process. Typically, the showerhead assemblies include handheld showerheads which insert or slide into a given slot or bracket. Examples of such constructions are disclosed in U.S. Pat. Nos. 7,966,677, 7,665,676, and U.S. Patent Publication No. 2019/0176170. However, none of these embodiments disclose a handheld assembly that enables a showerhead to be adjusted vertically.

Unfortunately, though handheld showerheads provide many advantages compared to their fixed showerhead counterpart, handheld showerheads suffer from several disadvantages. For example, U.S. Pat. No. 9,919,331 and Chinese Patent No. 106076677 describe handheld showerhead assemblies that utilize a magnet attachment mechanism. In these embodiments, the constructions do not provide much adjustability with regard to the angle or height of the spray.

Many of these embodiments disclose a handheld showerhead assembly that is fixed in its mount position. Thus, it would be advantageous to provide a showerhead assembly that included a firm fastener which would allow the user to adjust the height and angle of the handheld showerhead when it is affixed to a wall.

SUMMARY OF THE INVENTION

The present invention addresses the aforementioned disadvantages by providing an improved handheld showerhead assembly which includes a mounting structure for supporting a handheld showerhead through a ball joint. The showerhead assembly includes a handheld showerhead including a showerhead and a handle. The showerhead has a backside, and front face which has a plurality of nozzles for expelling water such as within a shower.

The handheld showerhead's handle is elongate so as to define a longitudinal axis having a proximal end and a distal end. Additionally, the handheld showerhead includes a channel for conveying water from the handle's proximal end to the handle's distal end for being expelled from the showerhead's nozzles. The handle's distal end affixes to the showerhead at an angle, such as 45° to 90°. Preferably, the handle's proximal end is threaded for connecting to a flexible hose. In turn, the other end of the hose is connected to a shower stall pipe to supply water through the handle to the showerhead. Various channel, conduit and nozzle constructions can be determined by those skilled in the art for diverting water from the handle's inlet to the showerhead's nozzles.

Moreover, the showerhead assembly of the present invention further possesses a mounting structure for releasably affixing the handheld showerhead to a wall, such as a wall within a shower stall. Specifically, the mounting structure includes magnetic coupling assembly for magnetically affixing the handheld showerhead to a wall. In a first preferred embodiment, the magnetic coupling assembly includes a magnet affixed to or integrated within the backside of the showerhead. In a preferred embodiment, the magnet is affixed to the backside of the showerhead by a ball joint assembly including a ball and cavity construction. Preferably, the ball extends from the magnet and the cavity is formed in the backside of the showerhead. However, these elements may be reversed such that that ball of the ball joint assembly extends from the backside of the showerhead and the magnet portion includes a cavity for receiving the ball. Advantageously, the ball joint assembly allows the showerhead to rotate, and the showerhead face to swivel side-to-side and up-and-down. Preferably, the ball joint provides at least 15° of swivel in each direction. A preferred ball joint assembly allows the showerhead face to swivel 19° in any direction.

In addition, the magnetic coupling assembly includes an elongate strip of a corrosion resistant ferromagnetic metal which forms a magnetic attraction with the showerhead's backside's magnet. The wall strip has a front side which engages and forms a magnet attachment, to the showerhead's backside. Furthermore, the wall strip has a back surface which is affixed to a shower wall by a fastener, as can be selected by one skilled in the art, such as an adhesive, adhesive backed tape, screws, or the like.

The wall strip may be any shape and any size. A preferred wall strip is rectangular and has dimensions of between 0.5-4 inches wide and 12-36 inches long so as to have an elongate axis. The wall strip may be positioned vertically or horizontally. More preferably, the wall strip is affixed vertically upon a wall and has dimensions of between 1-3 inches wide, and 12-24 inches tall. The wall strip may be affixed at any angle upon a wall. However, it is preferred that the wall strip is affixed vertically upon a wall and has dimensions of 2 inches wide and 18 inches tall.

Advantageously, the handheld showerhead can be affixed anywhere upon the wall strip so allow a bather to vertically adjust the position of the showerhead upon a shower stall wall. In addition, multiple wall strips may be placed upon a wall to provide attachment points throughout a shower stall.

Moreover, the ball joint assembly allows a bather to rotate or swivel the showerhead position into an unlimited number of positions.

Furthermore, the handheld showerhead can be affixed to or removed from the shower wall with minimal effort.

Other features and advantages of the present invention will be appreciated by those skilled in the art upon reading the detailed description which follows with reference to the drawings.

DETAILED DESCRIPTION OF THE INVENTION

Figure 1:
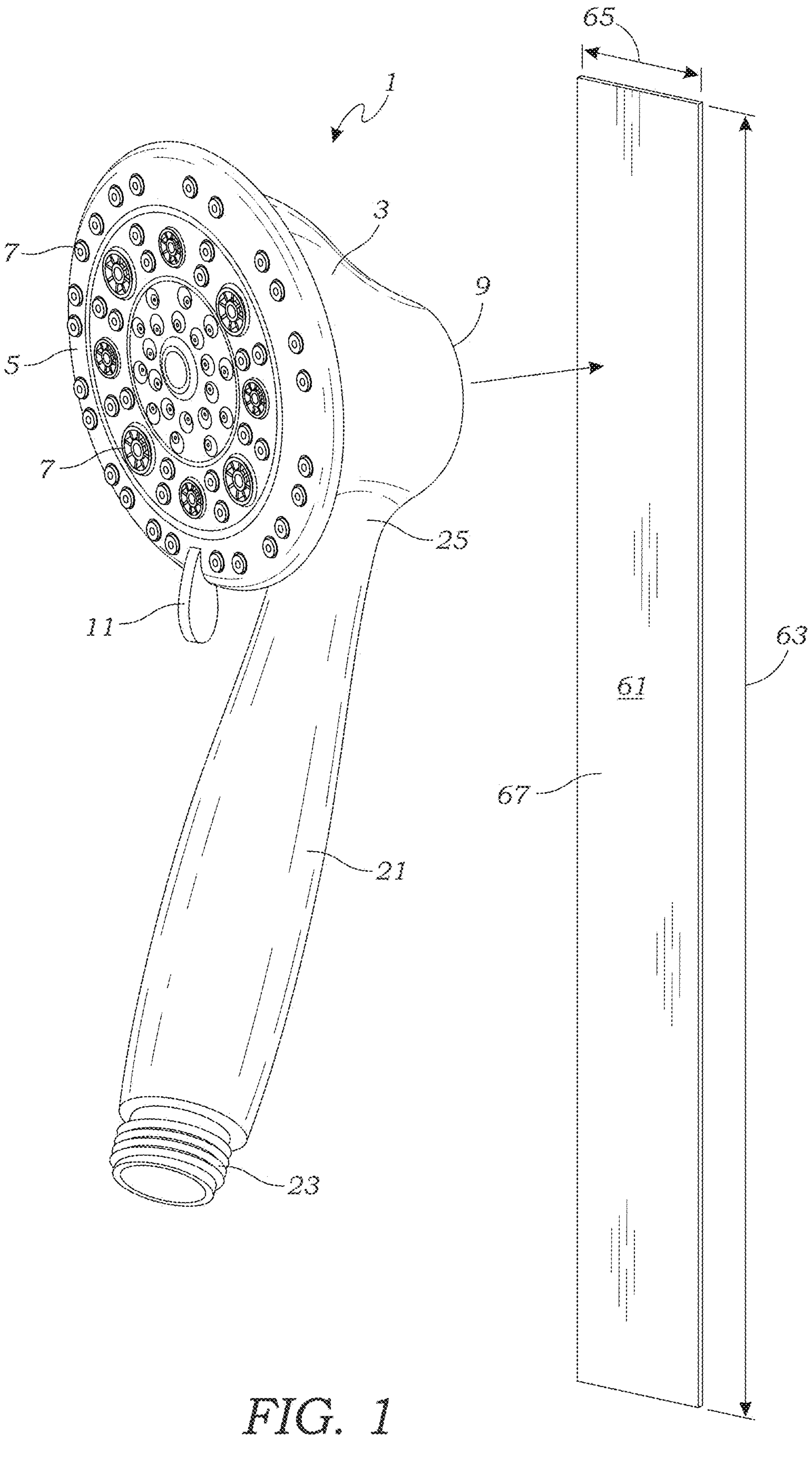
FIG. 1 is a front right perspective view of the handheld showerhead and wall strip of a first embodiment of the handheld showerhead and magnetic coupling assembly.
Figure 2:
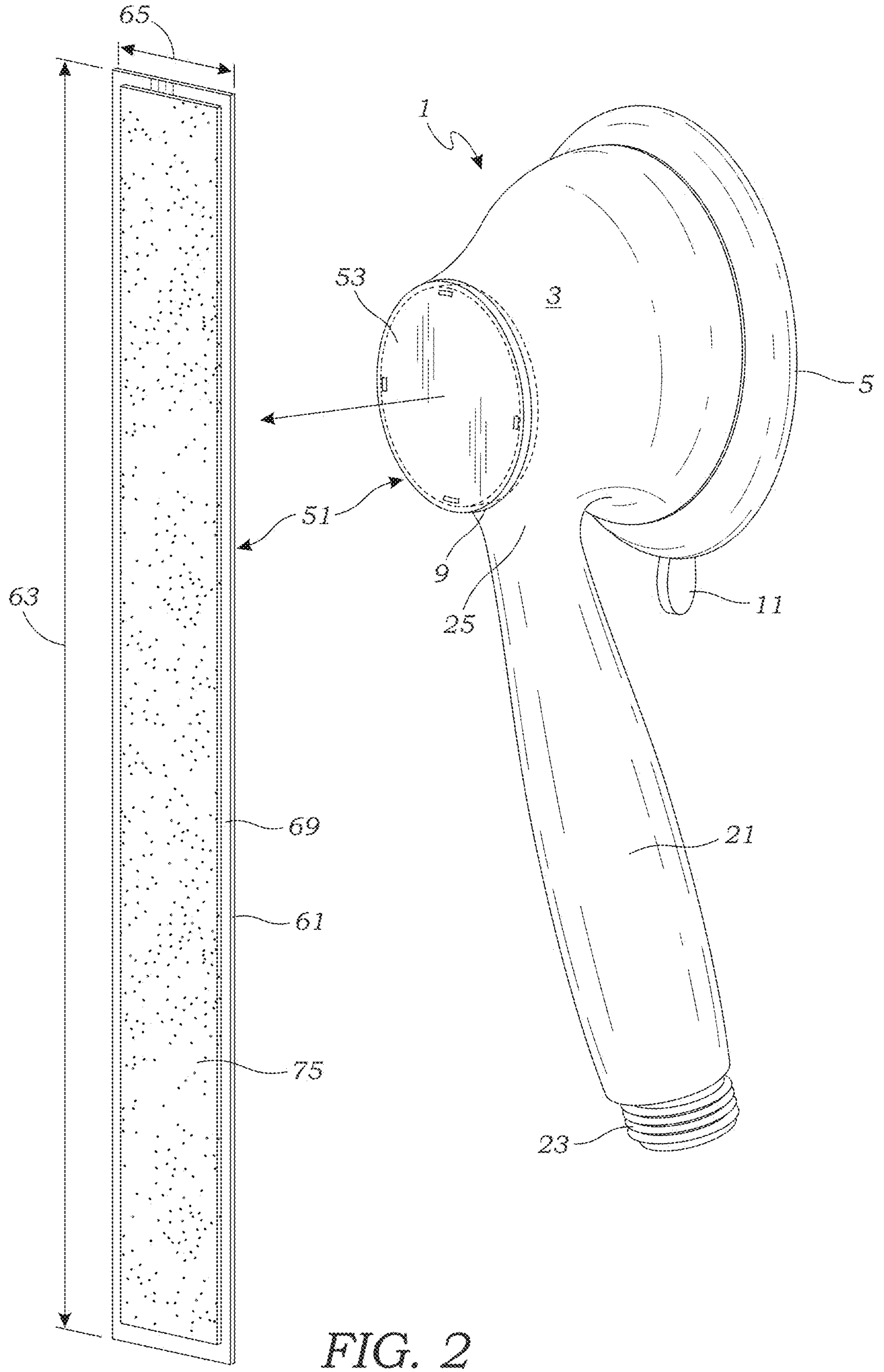
FIG. 2 is a real left perspective view of the handheld showerhead and wall strip of the handheld showerhead and magnetic coupling assembly shown in FIG. 1.

While the present invention is susceptible of embodiment in various forms, as shown in the drawings, hereinafter will be described the presently preferred embodiments of the invention with the understanding that the present disclosure is to be considered as an exemplification of the invention, and it is not intended to limit the invention to the specific embodiments illustrated.

With reference to all FIGS. 1-12, the showerhead assembly includes three primary portions including: a handheld showerhead assembly 1, a flexible hose 31; and a mounting structure 51 for engageably and disengageably affixing the handheld showerhead assembly 1 to a shower wall 45. With reference primarily to FIGS. 1-3 and 6-8, the handheld showerhead portion 1 of the showerhead assembly has a relatively traditional construction including a showerhead 3 and a hollow handle 21 having a proximal end 23 which affixes to a flexible hose 31. The handle 21 includes a longitudinal axis, and preferably the showerhead 3 affixes to the distal end 25 of the handle 21 at an angle, such as 45° to 90°, relative to the handle's longitudinal axis. The showerhead assembly's showerhead 3 has a backside 9 and a face 5 through which a plurality of nozzles 7 project. As understood by those skilled in the art, water is capable of flowing through a channel (not shown) within the center of the handle 21 which connects to the showerhead's nozzles 7 which are constructed to spray water.

Figure 3:
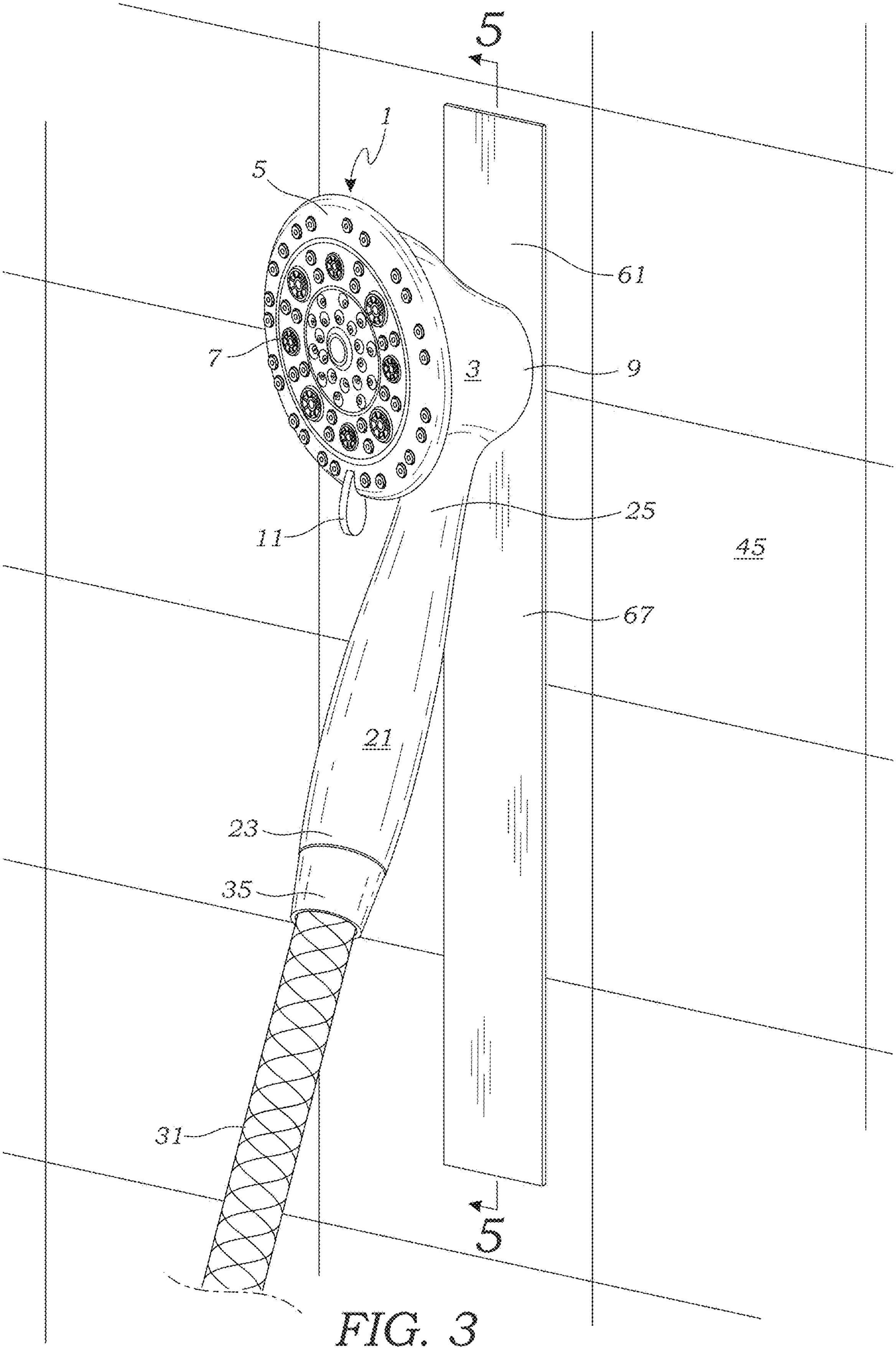
FIG. 3 is a front right perspective view of the handheld showerhead, flexible hose and wall strip of the handheld showerhead and magnetic coupling assembly shown in FIG. 1 wherein the handheld showerhead has been affixed to a shower wall.
Figure 4:
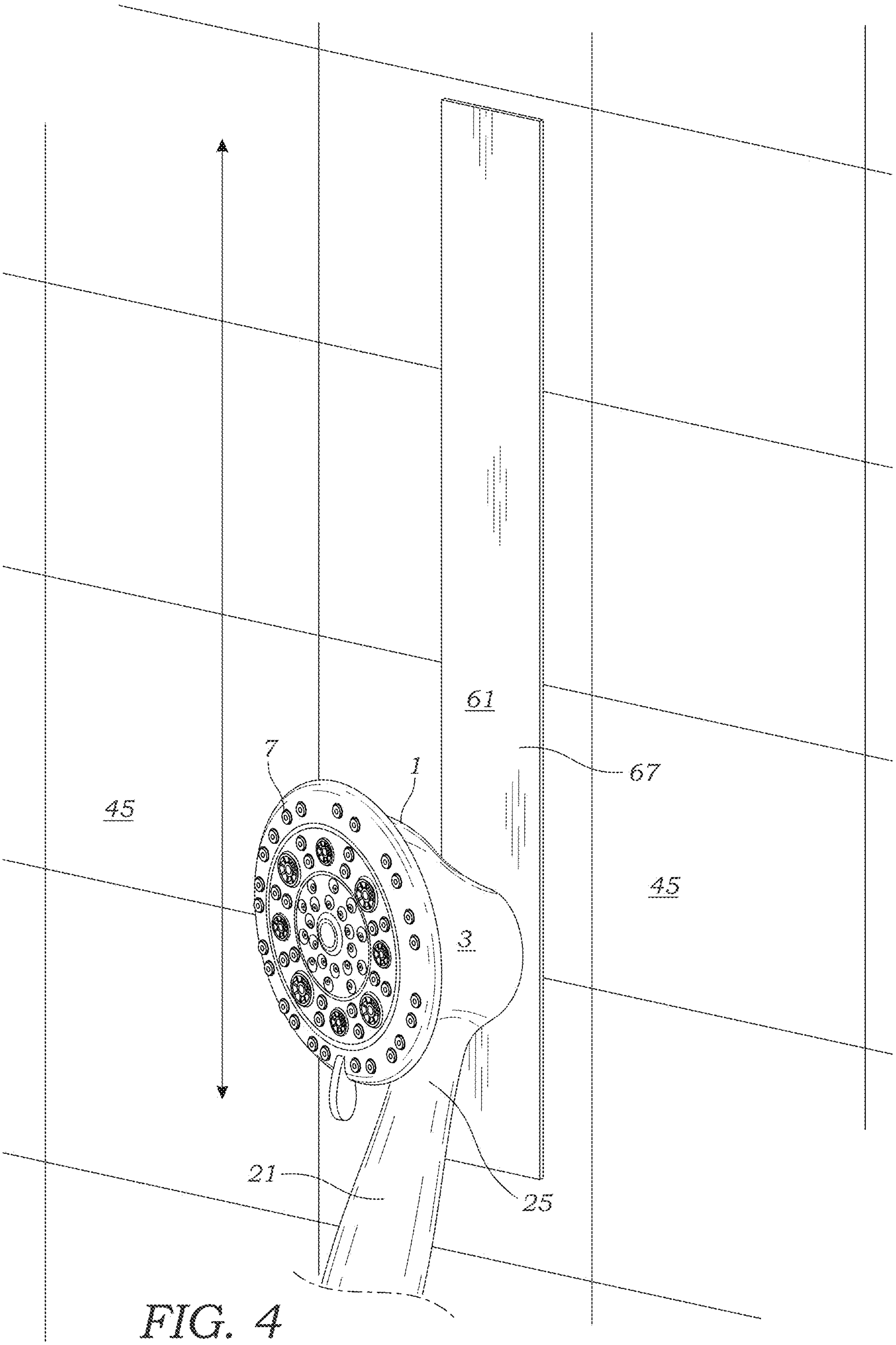
FIG. 4 is a front right perspective view of the handheld showerhead and wall strip of the handheld showerhead and magnetic coupling assembly shown in FIG. 3 wherein the handheld showerhead has been moved downward upon a shower wall.
Figure 5:
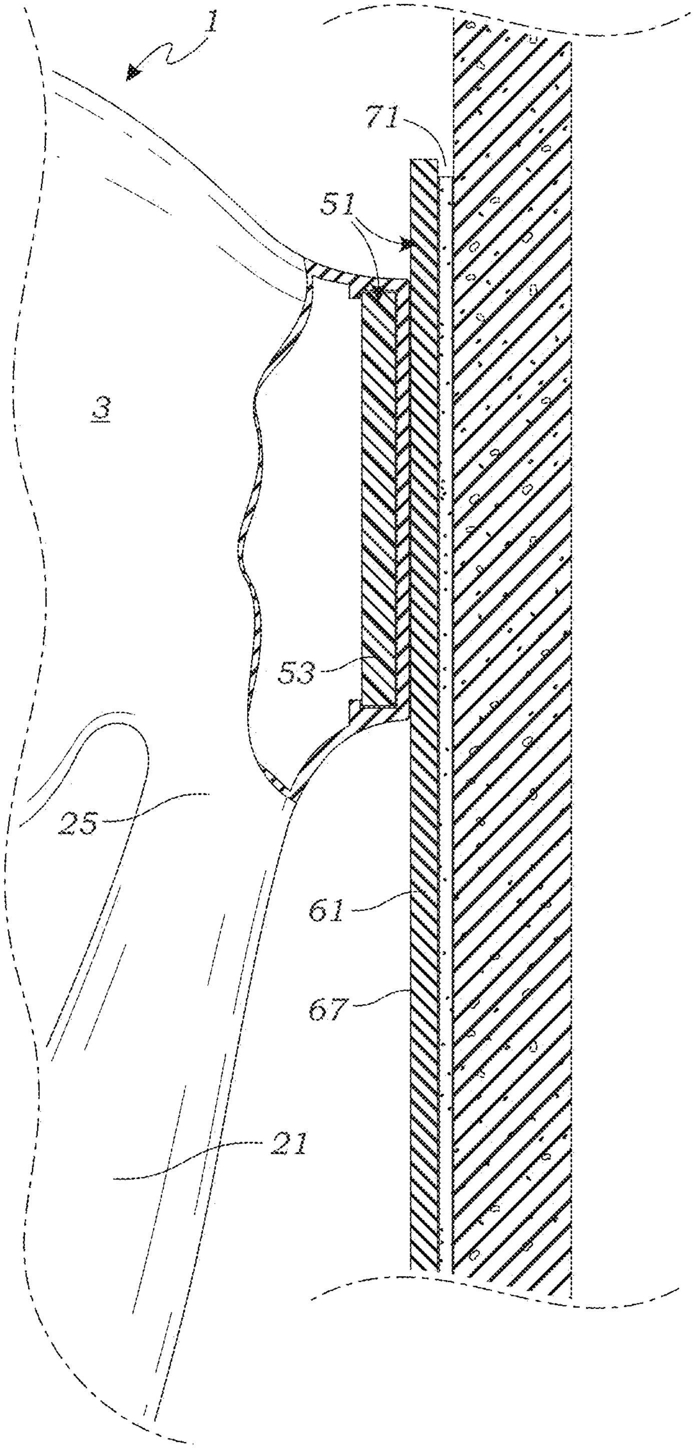
FIG. 5 is a side cutaway view of the handheld showerhead and wall strip of the handheld showerhead and magnetic coupling assembly as mounted upon a shower wall, as shown in FIG. 3.
Figure 6:
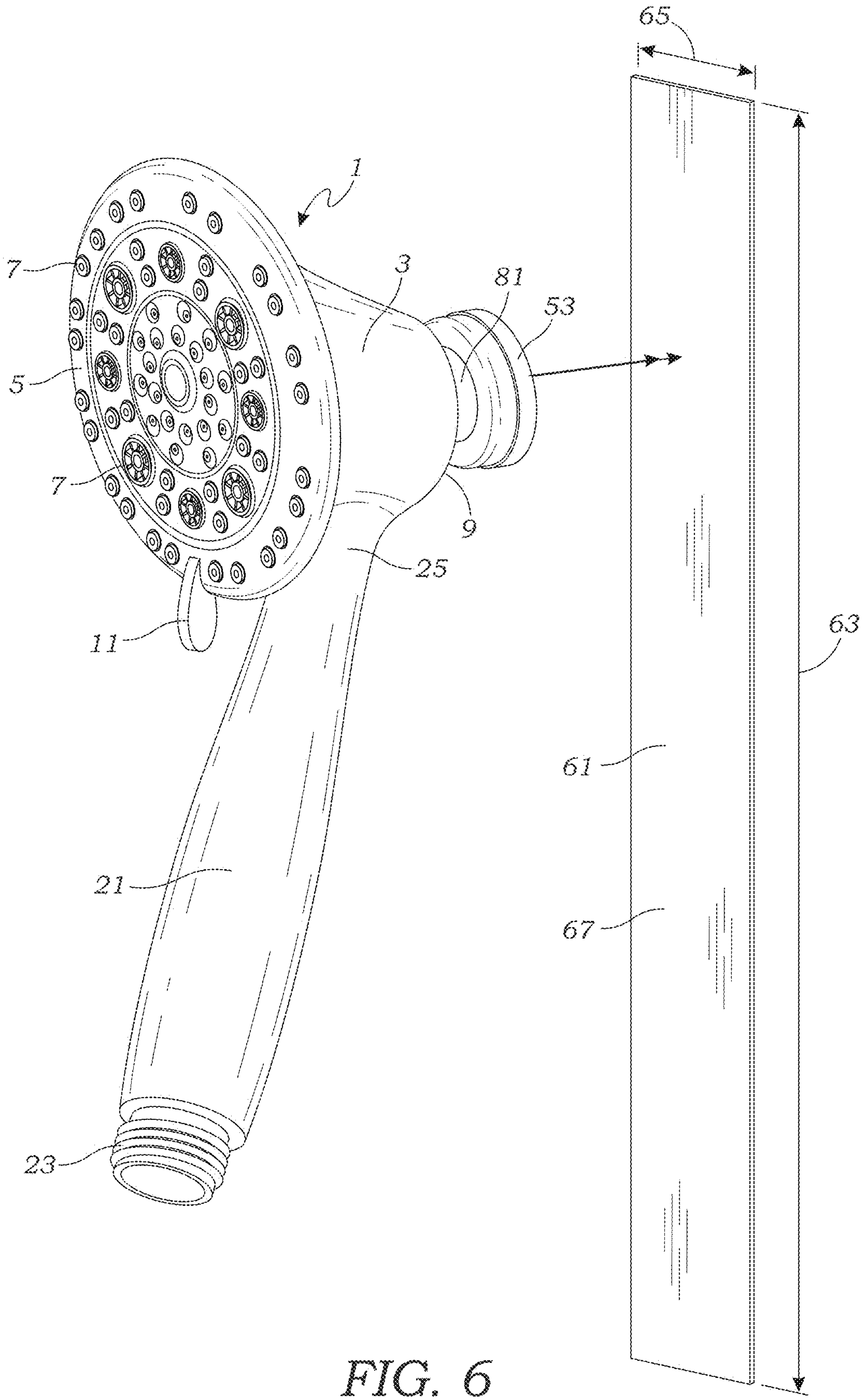
FIG. 6 is a front right perspective view of the handheld showerhead and wall strip of a second embodiment of the handheld showerhead and magnetic coupling assembly wherein the magnet is affixed to the backside of the showerhead by a ball joint.
Figure 8:
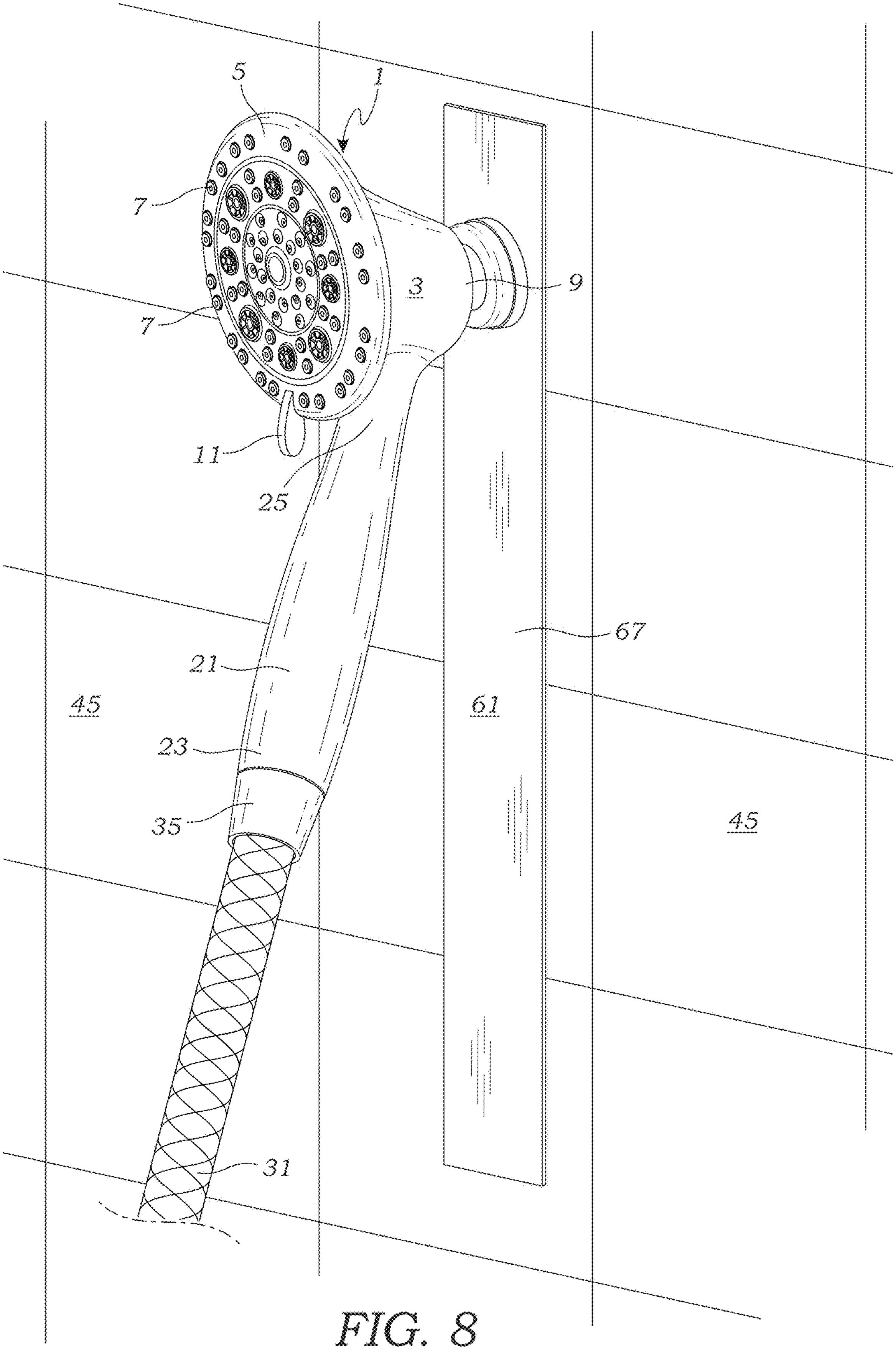
FIG. 8 is a front right perspective view of the handheld showerhead, flexible hose and wall strip of the handheld showerhead and magnetic coupling assembly shown in FIG. 6 wherein the handheld showerhead has been affixed to a shower wall.
Figure 9:
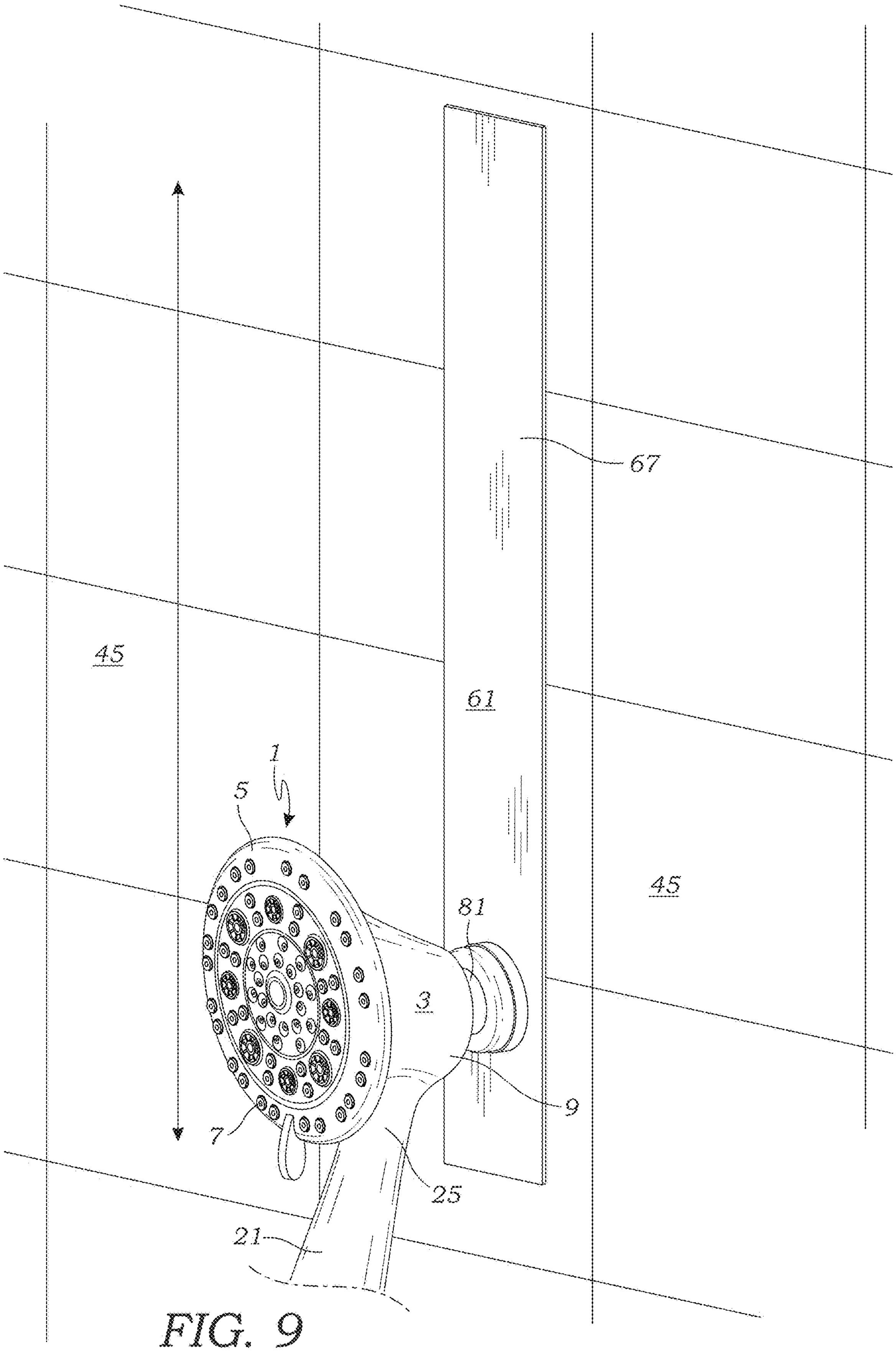
FIG. 9 is a front right perspective view of the handheld showerhead and wall strip of the handheld showerhead and magnetic coupling assembly shown in FIG. 8 wherein the handheld showerhead has been moved downward upon a shower wall.

Preferably, but not necessarily, the showerhead 3 includes a controller 11, such as the knob or tab, which is capable of altering the flow of water so as to provide the showerhead with the capability of producing different spray patterns. As illustrated in FIGS. 3 and 8, preferably the handheld showerhead's hollow handle's 21 proximal end 23 has male threads for connecting to female threads 33 at the distal end 25 of a flexible hose 31. In addition, the hose's proximal end has female threads to connect to the male threads of a pipe (not shown) which projects from the wall or ceiling of a shower wall 45.

The showerhead assembly's mounting structure 51 is capable of affixing or disengaging the handheld showerhead 3 from the shower wall 45. To this end, the mounting structure includes a magnet 53 and a wall strip 61. The magnet 53 is affixed to backside 9 of the showerhead 3. The magnet 53 may be affixed to the showerhead by any fastener construction as can be determined by one skilled in the art. For example, in a first embodiment illustrated in FIGS. 3, the magnet 53 is substantially planar and circular and affixed to the showerhead's planar backside 9 such as by an adhesive. Alternatively, the magnet 53 may be affixed to the showerhead's backside by integrating the magnet within the showerhead's housing, such as by covering the magnet with a thick layer of plastic.

Figure 7:
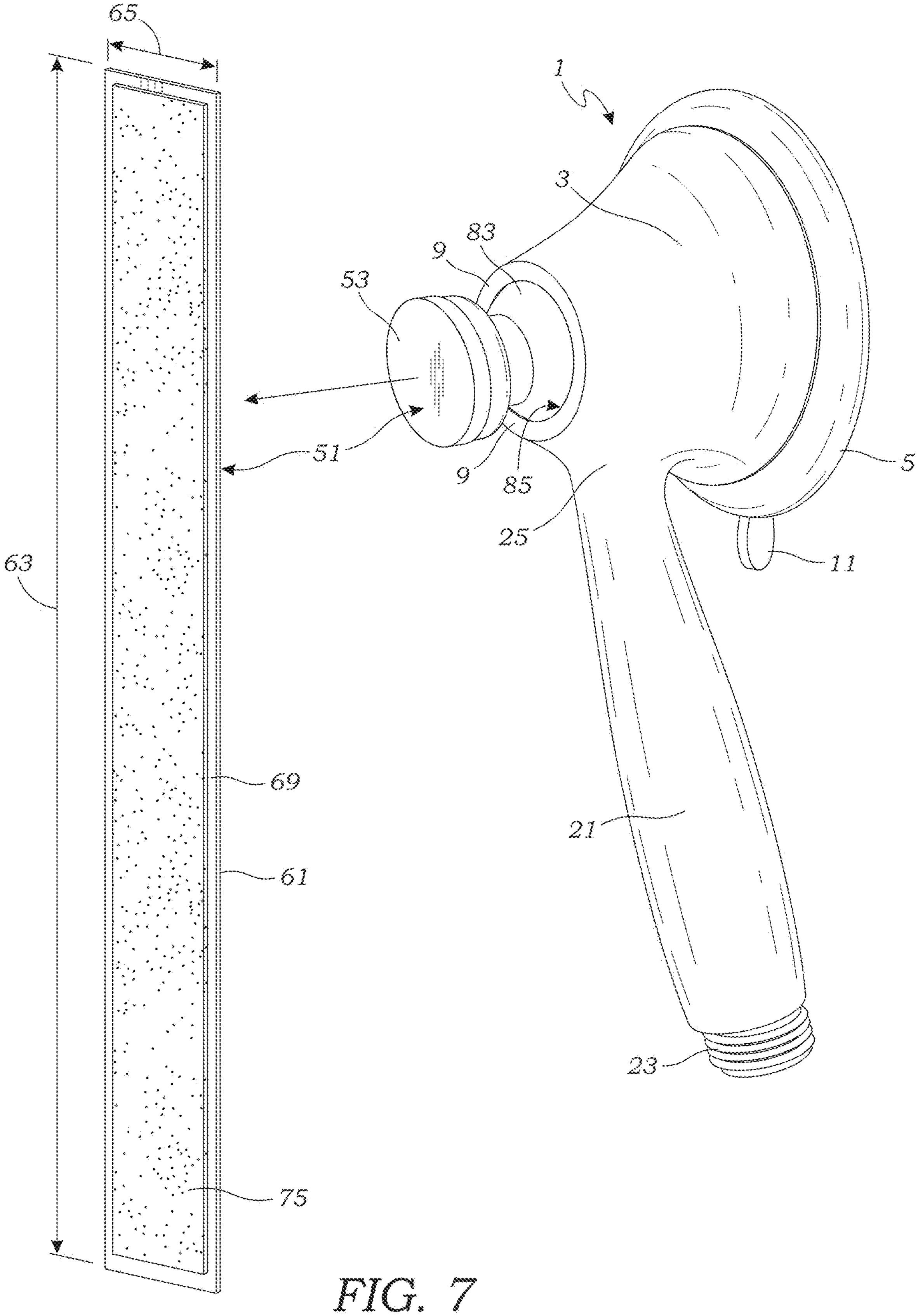
FIG. 7 is a real left perspective view of the handheld showerhead and wall strip of the handheld showerhead and magnetic coupling assembly shown in FIG. 6.
Figure 12:
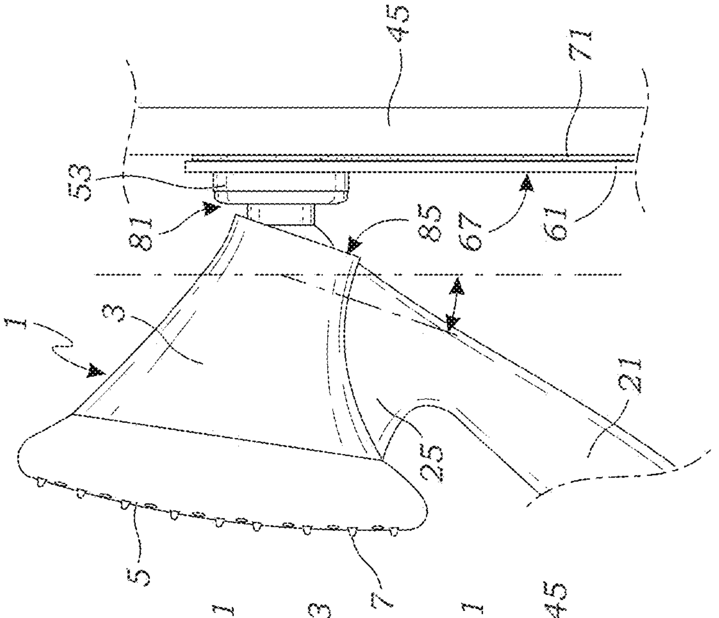
FIG. 12 is a side view of the handheld showerhead and wall strip of the handheld showerhead and magnetic coupling assembly shown in FIG. 10 wherein the showerhead has been swiveled to point upwardly.
Figure 11:
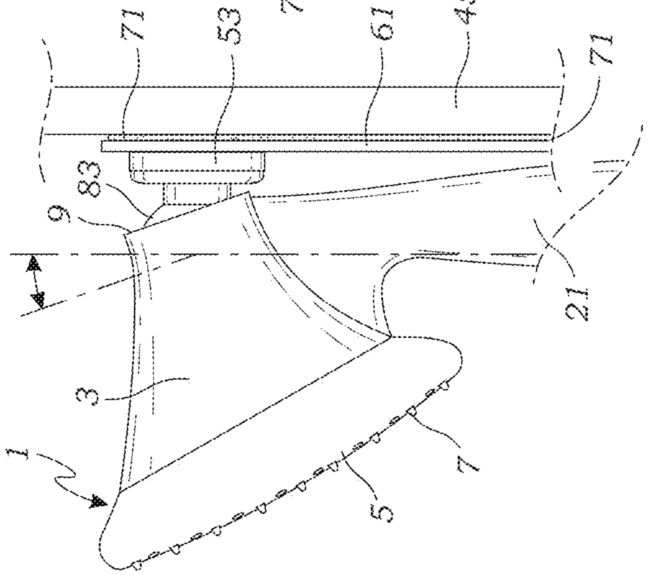
FIG. 11 is a side view of the handheld showerhead and wall strip of the handheld showerhead and magnetic coupling assembly shown in FIG. 10 wherein the showerhead has been swiveled to point downwardly.
Figure 10:
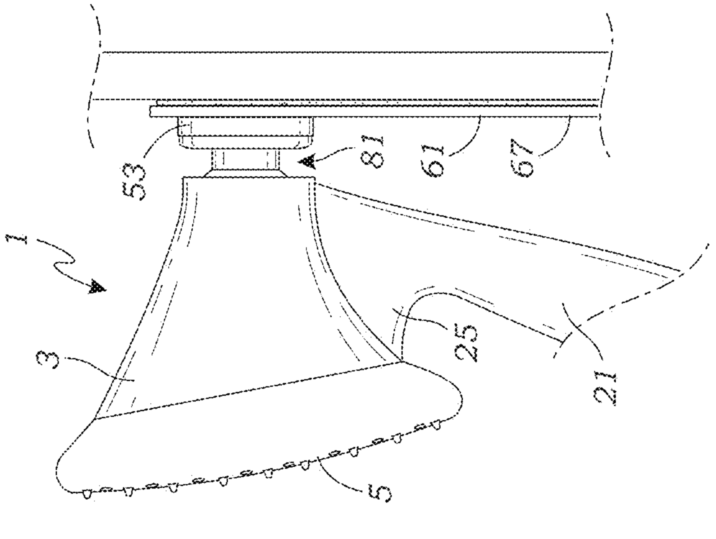
FIG. 10 is a side view of the handheld showerhead and wall strip of the handheld showerhead and magnetic coupling assembly shown in FIG. 8.

In an alternative preferred embodiment illustrated in FIGS. 7-12, the magnet is affixed to the backside 9 of the showerhead 3 by a ball joint assembly 81 which includes a ball 83 and cavity 85 construction. As illustrated in FIG. 7, preferably the ball 83 extends from the magnet 53 and the cavity portion 85 of the ball joint assembly 81 is formed in the backside 9 of the showerhead 3. However, these elements may be reversed such the magnet portion includes a cavity for receiving the ball and the ball of the ball joint assembly extends from the backside of the showerhead. For either construction, the ball joint assembly 81 permits the showerhead to rotate, and the showerhead face to swivel side-to-side and up-and-down, as illustrated in FIGS. 10-12. Preferably, the ball joint provides at least 15° of swivel in each direction. A preferred ball joint assembly allows the showerhead face to swivel 19° in any direction.

In addition, the magnetic coupling assembly 51 includes a wall strip 61 made of a corrosion resistant ferromagnetic metal which is capable of forming a magnetic attraction with the showerhead's backside's magnet 53. Ferromagnetic metals include iron, cobalt, steel, nickel, manganese, gadolinium, and lodestone, and combinations thereof. The wall strip 61 has a front side 67 which engages and forms a magnet attachment, to the showerhead's backside.

The wall strip may be in shape or size including round, oval, square rectangular. In addition, a shower stall may be provided with one large wall strip 61 affixed to one wall 45, or multiple wall strips located on one or more walls. A preferred wall strip 61 has width 65 of between 0.5-4 inches, and a height of 12-36 inches. This wall strip 61 may be mounted horizontally across a wall 45. More preferably, the wall strip 61 is intended to be affixed with its long axis extending vertically upon a wall 45, and the wall strip 61 has a width 65 of between 1-3 inches wide, and a height of 12-24. inches tall. The more preferred wall strip is intended to be affixed vertically upon a wall and has dimensions of 2 inches wide and 18 inches tall. The backside of the showerhead and/or the front side of the wall strip may include high-friction surfaces such as roughened surfaces, including ribs, grooves, or projections for inhibiting the showerhead from sliding upon the wall strip, such as sliding downward due to the force of gravity.

In a less preferred embodiment, the wall strip 61 is made of a material having magnetic properties and the backside of the showerhead 3 includes a plate made of ferromagnetic material. In still another less preferred embodiment, both the backside of the showerhead and the elongate strip are made of magnet materials having opposite polarity for forming an attraction and attachment between the two. However, these last two embodiments are not considered preferred due to their increased costs of manufacturing.

Furthermore, the showerhead assembly's mounting structure 51 includes a fastener for affixing a wall strip's backside 69 to a shower wall 45. As illustrated in FIGS. 2, 5, 7 and 10-12, a preferred fastener is an adhesive backed tape 71 which is pre-installed upon the back surface 69 of the wall strip 61. This wall strip 61 embodiment can be affixed to a wall by simply removing the adhesive tape's backing (not shown) and pressing the wall plate 61 at a desired location of the shower wall 45. Alternative fasteners can be selected by those skilled in the art, such as an adhesive, mortar, adhesive screws, or the like.

As illustrated in FIGS. 3, 4, 8 and 9, preferably but not necessarily, the wall strip 61 is intended to be mounted with the wall strip's long axis extending vertically so that the showerhead 3 can be affixed to the wall 45 at heights. Furthermore, as illustrated in FIGS. 10-12, the ball joint assembly 81 permits the showerhead to spray at various angles up or down, or side-to-side. Preferably, the showerhead is capable of tilting up, down, left or right, or combinations thereof by at least 15°, and more preferably about 19° in any direction. However, the ball joint assembly 81 may be constructed to provide more or less tilting as desired by the bather.

While preferred showerhead assemblies have been illustrated and described, it will be apparent that various modifications can be made without departing from the spirit and scope of the invention. Alternative embodiments may be envisioned by those skilled in the art after consideration of the present disclosure. Accordingly, it will be apparent that various modifications can be made without departing from the spirit and scope of the invention.

Therefore, having described my invention in such terms such as to enable a person skilled in the art to understand the invention, recreate the invention and practice it, and having presently identified the presently preferred embodiments thereof, I claim:

1. A handheld showerhead assembly comprising:

a handheld showerhead including a showerhead and an elongate hollow handle, said showerhead having a rear side, a front face and a plurality of nozzles projecting from said front face, said elongate hollow handle having a proximal end and a distal end with said distal end affixed to said showerhead, said handheld showerhead further including a channel connecting said hollow handle's proximal end to said nozzles for transporting water received from said handle's proximal end to said nozzles;

a flexible hose having first and second ends with said first end being connectable to said elongate handle's proximal end;

a mounting structure including a magnet, a wall strip, and a fastener, wherein the magnet is affixed to the backside of the showerhead, wherein said wall strip is planar, has a front side, a back surface, and an elongate longitudinal length larger than said magnet, and wherein said fastener is constructed to affix said wall strip's back surface to a shower wall; and wherein said wall strip is made of a ferromagnetic material the entirety of said wall strip's elongate longitudinal length and said magnet is configured to magnetically couple the showerhead directly to the wall strip at a plurality of different positions along the elongate longitudinal length of the wall strip without a mechanical guide, track, or discrete docking structure, such that the showerhead is selectively positionable at any of a continuum of locations along the wall strip by magnetic attraction alone.

2. The handheld showerhead assembly of claim 1 wherein said wall strip has a width of at least one (1) inch and a height of at least twelve (12) inches.

3. The handheld showerhead assembly of claim 1 wherein said wall strip has a width of at one (1) to three (30) inches and a height of twelve (12) to thirty-six (36) inches.

4. The handheld showerhead assembly of claim 1 wherein said fastener is an adhesive.

5. The handheld showerhead assembly of claim 1 wherein said fastener is an adhesive backed tape.

6. The handheld showerhead assembly of claim 1 wherein said fastener includes a plurality of screws.

7. The handheld showerhead assembly of claim 1 wherein said magnet is affixed to said showerhead's backside by a ball joint assembly including a ball and a cavity, and wherein the ball joint is configured to permit angular adjustment of the magnet relative to the showerhead while the magnet remains magnetically coupled to the wall strip, such that an orientation of a magnetic coupling interface between the showerhead and the wall strip is adjustable independently of an orientation of water discharge from the showerhead.

8. The handheld showerhead assembly of claim 7 wherein said showerhead's backside includes said cavity, and said ball extends from said magnet.

9. The handheld showerhead assembly of claim 7 wherein said wall strip has a width of at least one (1) inch and a height of at least twelve (12) inches.

10. The handheld showerhead assembly of claim 7 wherein said wall strip has a width of at one (1) to three (30) inches and a height of twelve (12) to thirty-six (36) inches.

11. The handheld showerhead assembly of claim 7 wherein said fastener is an adhesive.

12. The handheld showerhead assembly of claim 7 wherein said fastener is an adhesive backed tape.

13. The handheld showerhead assembly of claim 7 wherein said fastener includes a plurality of screws.

* * * * *